April 9, 1940.  H. J. OSBORN  2,196,362
ELECTRICAL SWITCH OPERATED BY LEAKAGE CURRENT
Filed Sept. 21, 1937  2 Sheets-Sheet 1
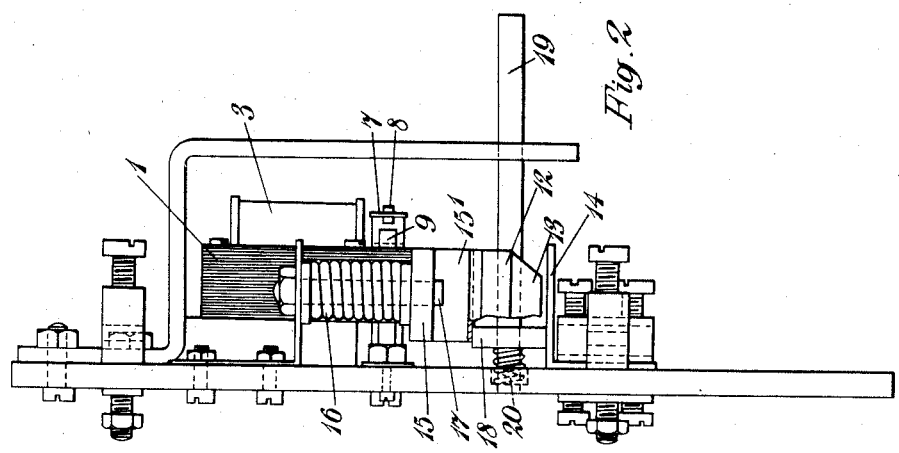
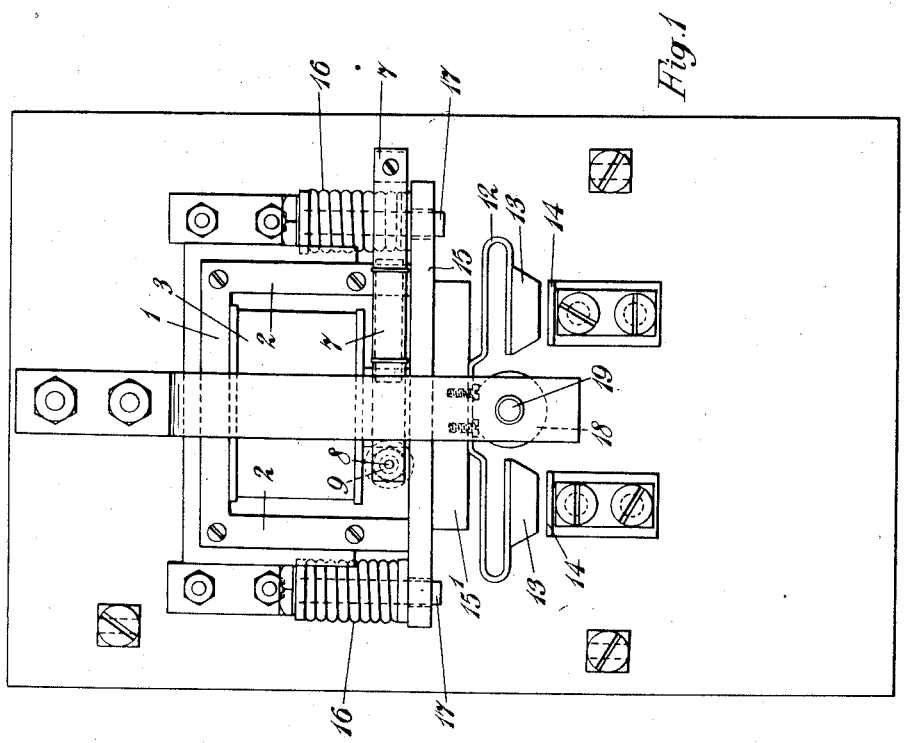

April 9, 1940.   H. J. OSBORN   2,196,362
ELECTRICAL SWITCH OPERATED BY LEAKAGE CURRENT
Filed Sept. 21, 1937   2 Sheets-Sheet 2

H. J. Osborn
Inventor

By: Glascock Downing & Seebold
Attys.

Patented Apr. 9, 1940

2,196,362

UNITED STATES PATENT OFFICE 2,196,362

ELECTRICAL SWITCH OPERATED BY LEAKAGE CURRENT

Henry James Osborn, Glasgow, Scotland, assignor to H. J. Osborn & Sharp Limited, Glasgow, Scotland Application September 21, 1937, Serial No. 164,965
In Great Britain September 26, 1936

6 Claims. (Cl. 175—294)

This invention relates to relay operated cut-out switches of the type which are actuated by means of a relay operated by a leakage current occurring between the casing or framework of the apparatus to be protected and the earth or neutral due to a fault in the system.

It has been proposed in such a device to connect one end of the relay coil energizing the electro-magnetic means to the casing or framework of the apparatus to be protected and the other end to the earth or neutral so that when any current flowed between the two due to a fault the electro-magnet operated the main switch and opened the circuit.

It is customary to provide the casing or framework of a modern electrical apparatus with an earthed connection having a low resistance value so that in the event of any fault in the insulation of the live electrical conductors, the main fuse in the circuit blows. If, however, the earth connection has a high resistance value, the fuse will not blow and the casing or framework of the apparatus may be alive to the full potential of the circuit.

One object of the invention is to provide a relay operated switch which will operate with a small leakage current due to a fault, leak or other cause occurring immediately the difference of potential between the said casing or framework of the apparatus and the earth created thereby reaches a predetermined value.

Another object of the invention is to provide an earth leakage cut-out switch which is not subject to atmospheric or temperature changes, nor adversely affected by the presence of dust or grit in the switch itself which can be easily calibrated to trip on a low voltage rise, and the calibration of which remains constant under all circumstances.

Another object of the invention is to provide a relay operated cut-out switch of the above type in which the leakage current is employed to energize electro-magnetic means which, on the potential of the casing or framework of the apparatus to be protected reaching a predetermined value above that of the earth or neutral due to a fault, actuates a switch to send current from the mains through the said or a second electro-magnetic means which operates the main switch to open the circuit.

A further object of the invention is to provide a relay-operated cut-out switch in which the switch is actuated by electro-magnetic means energized by a main coil which is momentarily connected across the mains by means of a sensitive relay energized by the leakage current when the casing or framework of the apparatus to be protected reaches a predetermined potential above that of the earth or neutral due to a fault.

The invention will now be described by way of example with reference to the accompanying drawings in which:

Figure 1 is an elevation of a relay cut-out switch.

Figure 2 is a side view of Figure 1.

Figure 3:
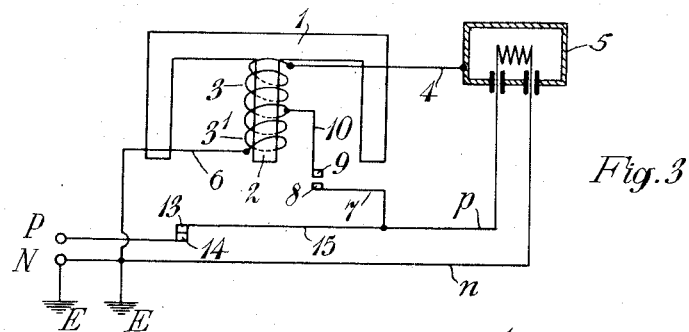
Figure 3 is a diagrammatical representation of the parts and their electrical connections of Figures 1 and 2.

Referring to the form illustrated by way of example in Figures 1 to 3 of the drawings and as applied to the protection of the casing or framework of an electrical apparatus, an electro-magnet 1 having three limbs or poles 2 is provided, the centre one being supplied with the winding 3, one end of which is connected by the lead 4 to the casing or framework of the apparatus 5 which it is desired to protect and the other end being connected by the lead 6 to a point at earth potential such as the neutral lead $n$ from the neutral terminal N of a three phase supply. Situated over the centre pole and one of the side poles is a light relay armature 7, which is held away from the pole by a light blade or helical spring, not shown. This armature 7 is provided with an auxiliary contact 8 arranged to make contact with another auxiliary contact 9, which is connected by a lead 10 to the centre tapping of the winding 3, which forms it into virtually two windings or coils. The auxiliary contact 8 on the armature 7 is connected to the phase terminal P of the source of supply by a lead $p$, on the apparatus side of the mains there being a cut-out switch situated between the main and the connection of the said lead. This cut-out switch comprises a blade or spring 12 having main contacts 13 which engage fixed main contacts 14. The spring 12 is secured through insulating means 15¹ to the main armature 15 which is situated near the poles 2 of the electro-magnet 1 and the main contacts 13 are held in contact with the fixed main contacts 14 by springs 16 on the pins 17, which form guides for extensions of the armature 15. When the armature 15 is attracted by the magnet 1, the main contacts 13 are separated from the main contacts 14 and the circuit is broken. In order to ensure that the circuit remains open the main contacts 13 are held away from the main contacts 14 by the stop 18 mounted on the sliding pin 19 which is pressed out by the spring 20 until it is under the armature 15 which cannot then drop down again to close the circuit.

If desired, the main contacts 13 and 14 may be held in engagement by gravity instead of spring means.

In operation the portion 3 of the winding on the electro-magnet is given a high impedance and is so proportioned that should the leakage current caused by any leak, fault or other cause in the electrical apparatus 5 raise the potential of its casing or framework above a predetermined value, the current flowing to earth or neutral will operate the relay armature 7, which will close the auxiliary contacts 8 and 9 of the relay switch and send a current from the mains P, N through the portion $3^1$ of the winding (Figure 3) on the electro-magnet which has a low impedance, with the result that the main armature is attracted and the cut-out switch is pulled up by the attraction of the electro-magnet and the circuit broken.

Figure 4:
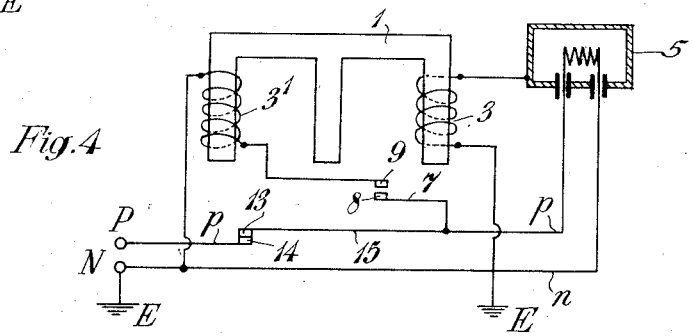
Figure 4 is a modification of Figure 3.

According to a modification of the electrical arrangement as shown diagrammatically in Figure 4 of the drawings, two separate windings an auxiliary 3 and the main $3^1$ are employed which may, in practice, be placed upon the central limb of the electro-magnet 1, as shown in Figure 1, but are only shown divided for simplicity in Figure 4. The auxiliary winding 3 takes only the earth leak current, while the main winding $3^1$ takes the current from the mains on the closing of the auxiliary contacts 8 and 9.

Further, separate electro-magnets may be employed for operating the relay switch and the main switch, which may have separate windings or may be supplied with series windings taking both leakage current and the main current.

For example, the device may be set so that it will cut out the main switch on a difference of potential of 40 volts between the casing of the apparatus and the earth. Any other value may, of course, be chosen to suit conditions.

Figure 5:
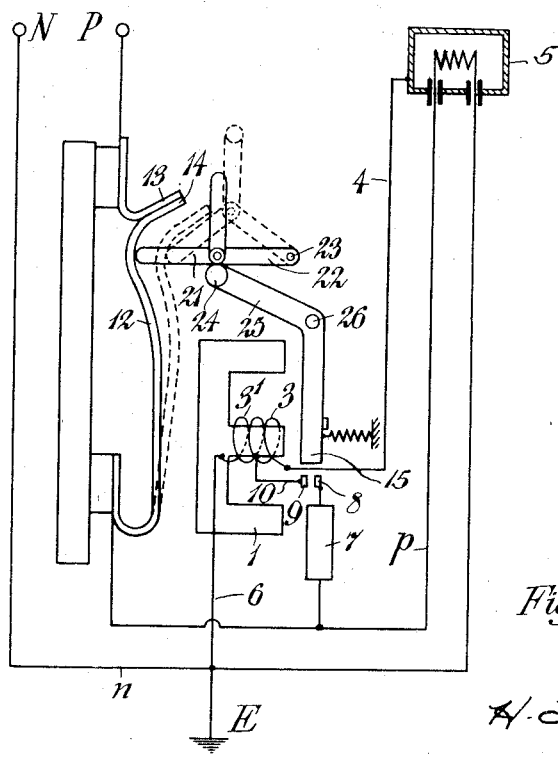
Figure 5 is another type of switch with the same electrical connection as shown in Figures 3 or 4.

According to another form of the invention as shown diagrammatically in Figure 5 the electromagnet 1 is provided, as before, with a relay switch having auxiliary contacts 8, 9 operated by the armature 7, which sends a current through the portion $3^1$ of the winding of the electro-magnet from the source of supply, but in this case the main switch is formed as a blade, spring or the like 12, which is held in engagement by means of a toggle joint 21, 22 pivoted at 23 when the said joint just passes over its neutral position. The centre of the toggle joint is held in this position by the end 24 of one arm of a bell crank lever 25, pivoted at 26, the other arm of which is provided with an armature 15, which is situated over the poles of the electro-magnet. On the relay armature 7 being attracted to the electro-magnet by the current flowing from the casing of the apparatus to earth through the lead 4 exceeding the predetermined amount, the other portion $3^1$ of the winding of the electro-magnet is given the full voltage of the mains and the bell crank lever pulled over, whereby the toggle joint is moved past its dead centre and the spring in the blade 12 or other means secured to the switch will open the circuit by moving the main contact 14 of the blade, spring or the like 12 out of engagement with the main contact 13.

Instead of employing a toggle joint for holding the main contact 14 of the blade 12 in engagement with the contact 13 an arm may be used, having a roller or other anti-friction means at the end which is pushed out of engagement with the blade 12 by means of the end 24 of the bell crank lever 25 when the armature 15 is attracted by the electro-magnet, or the said arm may be raised up so that it will pass through an aperture in the said blade 12, whereby the said blade 12 is permitted to snap back under suitable pressure to disengage the main contacts 13, 14.

It is to be understood that the amount of current passing in the leak before the switch is opened may be regulated to conform to any required condition by choosing the resistance of the wire and number of turns supplied to the winding and also by regulating the tension by which the relay armature is held away from the electro-magnet.

It is to be noted that since the relay switch is connected to the source of supply on the apparatus side of the cut-out switch, directly the main switch is cut out the whole relay switch and apparatus are dead. Further, the pin 19 or the toggle joint or other equivalent arrangement will have to be operated by hand to re-engage the main cut-out switch before the apparatus can be used again.

The leakage winding may be connected direct to earth or to the neutral lead or any other point at earth potential, when such is available.

In the switches above described having two coils connected together in series or kept separate, it is preferred to give the coil taking the small relay current a high impedance and the coil taking the main current a low impedance whereby the current from the mains on the momentary junction of the contacts 8 and 9 flows through the winding $3^1$ and not through the winding 3. The small current on reaching a predetermined value energizes the electro-magnetic means and closes the contacts which energize the low impedance coil and interrupt the main circuit.

It is to be understood that the forms of the device described above have been given by way of example only, and that various alterations thereto as well as other forms may be devised to suit varying conditions of service and circumstances under which they are used without departing from the scope of the invention.

I claim:

1. A relay actuated switch for preventing the casing or framework of an electrical apparatus fed by current from the mains one of which is earthed from remaining alive owing to an earth fault from the electrical apparatus to the casing including in combination an electro-magnetic device, an auxiliary movable member co-acting with said electro-magnetic device, means by which the ends of the electrical circuit of said electro-magnetic device can be connected to earth and to the casing or framework of the apparatus respectively, said auxiliary movable member being operated by a current flowing from the casing or framework of the electrical apparatus through the electro-magnetic device to earth on the occurrence of a fault, an auxiliary switch operated by said auxiliary movable member, means connecting said auxiliary switch to the electro-magnetic device and to the unearthed main respectively, said auxiliary switch when operated by the auxiliary movable member passing current from the unearthed main through the electro-magnetic device to the earthed main, a main movable member co-acting with said electro-magnetic device, and a main switch operated by said main movable member and connected in the main circuit leading to the said apparatus, the actuation of the said auxiliary movable member further energising the electro-magnetic device and opening the main switch.

2. A relay actuated switch for preventing the casing or framework of an electrical apparatus fed by current from the mains one of which is earthed from remaining alive owing to an earth fault from the electrical apparatus to the casing including in combination an electro-magnetic device, an auxiliary armature co-acting with said electro-magnetic device, means by which the ends of the electrical circuit of said electro-magnetic device can be connected to earth and to the casing or framework of the apparatus respectively, said auxiliary armature being operated by a current flowing from the casing or framework of the electrical apparatus through the electro-magnetic device to earth on the occurrence of a fault, an auxiliary switch operated by said auxiliary armature, means connecting said auxiliary switch to the electro-magnetic device and to the unearthed main respectively, said auxiliary switch when operated by the auxiliary armature passing current from the unearthed main through the electro-magnetic device to earth, a main armature co-acting with said electro-magnetic device and a main switch operated by said main armature and connected in the main circuit leading to the said apparatus, the actuation of the said auxiliary armature further energising the electro-magnetic device and opening the main switch.

3. A relay actuated switch for use in guarding against danger due to the casing or framework of an electric apparatus fed by current from the mains one of which is earthed becoming alive owing to an earth fault from the electrical apparatus to the casing, comprising an electro-magnetic device having an auxiliary and main movable member, a winding for said device, a terminal connected to one end of the said winding and adapted for connection to the casing or framework of the apparatus, a second terminal connected to the other end of said winding and adapted for connection to earth so that when current flows from the casing or framework of the apparatus through said winding to earth the device is energised and attracts the auxiliary movable member, a tapping in said winding, a lead connecting said tapping to the main unearthed, switch contacts included in said lead and controlled by said auxiliary magnet, said contacts being normally open but adapted to be closed by the auxiliary movable member when attracted by the electro-magnetic device so that current from the unearthed main then flows through the winding and energises the device whereby the main movable member is then attracted, and a main switch included in the mains circuit, said main switch being normally closed but adapted to be opened by the main movable member to interrupt the mains circuit when the main movable member is so attracted.

4. A relay actuated switch for use in guarding against danger due to the casing or framework of an electric apparatus fed by current from the mains one of which is earthed becoming alive owing to an earth fault from the apparatus to the casing, comprising an electro-magnetic device having an auxiliary and main armature, a winding for said device, a terminal connected to one end of the said winding and adapted for connection to the casing or framework of the apparatus, a second terminal connected to the other end of said winding and adapted for connection to earth so that when current flows from the casing or framework of the apparatus through said winding to earth the device is energised and attracts the auxiliary armature, a tapping in said winding, a lead connecting said tapping to the unearthed main, switch contacts included in said lead and controlled by said auxiliary magnet, said contacts being normally open but adapted to be closed by the auxiliary armature, when attracted by the electro-magnetic device so that current from the unearthed main then flows through the winding and energises the device whereby the main armature is then attracted, and a main switch included in the mains circuit, said main switch being normally closed but adapted to be opened by the main armature to interrupt the mains circuit when the main armature is so attracted.

5. An electro-magnetic relay for use in guarding against danger due to the casing or framework of an electric apparatus fed by current from the mains one of which is earthed becoming electrically alive owing to an earth fault from the apparatus to the casing, comprising an electro-magnetic device, two energising circuits for said device, terminals by which one of said circuits can be electrically connected to the casing or framework of the said apparatus and to earth respectively and the other circuit connected to the unearthed main and to earth respectively, an auxiliary movable member arranged to be attracted by the said device when energized by current flowing from the casing or framework of the apparatus through one of said circuits to earth when a fault takes place, a pair of contacts normally open but adapted to be closed by the auxiliary movable member when so attracted, said contacts being included in the second mentioned energizing circuit so that when closed the current from the unearthed main energizes the device, a main movable member attracted by the device when energized by the current from the unearthed main, and a switch normally closed but adapted to be opened by the main movable member when so attracted, the said switch when opened interrupting the mains circuit and thereby cutting off current to the said apparatus.

6. An electro-magnetic relay for use in guarding against danger due to the casing or framework of an electric apparatus fed by current from the mains one of which is unearthed becoming electrically alive owing to an earth fault from the apparatus to the casing, comprising an electro-magnetic device, two energizing circuits for said device, terminals by which one of said circuits can be electrically connected to the casing or framework of the said apparatus and to earth respectively and the other circuit connected to the unearthed main and to earth respectively, an auxiliary armature arranged to be attracted by the said device when energized by current flowing from the casing or framework of the apparatus through one of said circuits to earth when a fault takes place, a pair of contacts normally open but adapted to be closed by the auxiliary armature when so attracted, said contacts being included in the second mentioned energizing circuit so that when closed the current from the unearthed main energizes the device, a main armature attracted by the device when energized by the current from the unearthed main, and a switch normally closed but adapted to be opened by the main armature when so attracted, the said switch when opened interrupting the mains circuit and thereby cutting off current to the said apparatus.

HENRY JAMES OSBORN.